United States Patent [19]

Haberstroh et al.

[11] 4,071,391

[45] Jan. 31, 1978

[54] METHOD OF MANUFACTURING LAMINATED PANELS OR FOILS OF LEAD AND PLASTICS, ESPECIALLY ACRYLIC ACID POLYETHYLENE COPOLYMERS, AND LAMINATED PANELS OR FOILS OBTAINED THEREBY

[75] Inventors: Günter Haberstroh; Lothar Heistermann, both of Hamburg, Germany

[73] Assignee: Bleiindustrie KG Vorm. Jung & Lindig, Hamburg, Germany

[21] Appl. No.: 467,474

[22] Filed: May 6, 1974

[30] Foreign Application Priority Data

May 19, 1973 Germany .......................... 2325482

[51] Int. Cl.² .............................................. C09J 5/02
[52] U.S. Cl. ............................ 156/325; 156/315;308;
427/405;409; 428/461;621
[58] Field of Search ................ 29/195, 195 P, 195 L;
117/71 M; 156/308, 325, 306, 307, 308, 324,
326, 314, 327, 315; 206/277; 222/107; 428/457,
461; 427/404, 405, 409, 302; 260/33.4 R; 148/6,
31.5; 106/1 X

[56] References Cited

U.S. PATENT DOCUMENTS

| 3,260,410 | 7/1966  | Brandt et al. ............... 161/216 X |
| 3,455,775 | 7/1969  | Pohl et al. ..................... 156/307 |
| 3,505,143 | 4/1970  | Haas et al. ..................... 156/243 |
| 3,539,427 | 11/1970 | Vazirani ......................... 156/272 |
| 3,582,427 | 6/1971  | Baskai ............................. 428/461 |
| 3,607,614 | 9/1971  | MacKay et al. .............. 161/218 |
| 3,647,617 | 3/1972  | Rieke et al. .................... 428/461 |
| 3,647,617 | 3/1972  | Rieke et al. .................... 161/216 |
| 3,719,551 | 3/1973  | Radtke et al. ................. 428/461 |

FOREIGN PATENT DOCUMENTS

| 1,496,048 | 9/1967 | France ........................... 428/461 |
| 713,634   | 8/1954 | United Kingdom. |

Primary Examiner—Charles E. Van Horn
Assistant Examiner—J. J. Gallagher
Attorney, Agent, or Firm—Toren, McGeady and Stanger

[57] ABSTRACT

A method of manufacturing laminated panels or foils consisting of a lead sheet and a synthetic sheet by using lead alloyed with antimony and/or coating the lead sheet with an alloy of lead. Optionally a protective film serving as an adhesive may be applied onto the surface that is to be welded to the synthetic material. A novel compound material consisting of a lead sheet and a plastics sheet.

2 Claims, 6 Drawing Figures

METHOD OF MANUFACTURING LAMINATED PANELS OR FOILS OF LEAD AND PLASTICS, ESPECIALLY ACRYLIC ACID POLYETHYLENE COPOLYMERS, AND LAMINATED PANELS OR FOILS OBTAINED THEREBY

The present invention relates to a method of manufacturing laminated panels or foils consisting of lead and plastics, such as, especially polyethylene copolymers based on the basis of acrylic acid, and laminated panels or foils obtained by this method.

It is known that lead surfaces may be bonded with polyethylene and especially with copolymers of polyethylene with acrylic acid, without requiring any adhesives. For bonding, the mutually facing surfaces or both materials are cleaned by a suitable procedure, and then welded to each other under pressure, and at a temperature in the range from 140° C (284° F) to 200° C (392° F).

A recurring problem in the manufacture of laminated materials of this type is the lack of durability of the adhesiveness between the two materials. In an effort to improve the adhesive strength between lead and polyethylene it has heretofore already been proposed to add to the polyethylene, and particularly to the polyethylene copolymers with acrylic acid, sulfur, calcium sulfide or similar substances, with the aim of preventing or respectively suppressing corrosion phenomena in the boundary layer of lead and polyethylene.

Although these additives to polyethylene result in an increase of the initial adhesive strength between the lead and polyethylene immediately after the lamination process, the problem of a long term adhesive power has not been solved.

Proceeding from the assumption that for achieving a sufficiently high adhesive strength between lead and plastic must be predominantly present chemical bonding forces of the polar type bond, then these polar bonds will be strongly affected by the appearance of corrosion products of lead in the boundary layer between the lead and plastic. Such corrosion products of lead may be formed by the diffusion of water vapors, carbon dioxide or oxygen through the overlying polyethylene coating as well as by decomposition products of the polyethylene acrylic acid copolymer itself; at least to the extent that such decomposition products penetrate into the boundary layer between the lead and plastic.

For obtaining a long term adhesive bond between lead and polyethylene in compound materials of the type contemplated here, it is therefore necessary to employ a lead metal surface that is corrosion resistant as pointed out above, for coating with the polyethylene acrylic acid copolymers.

It is therefore the object of the present invention to provide a corrosion resistant lead metal surface that is suitable for coating with polyethylene acrylic acid copolymers in the manufacture of laminate materials consisting of lead and polyethylene which exhibit a long term adhesive strength between the lead and polyethylene.

It is another object of the present invention to provide a novel and improved method of manufacturing compound materials, such as, panels and foils of lead and a plastic or synthetic material.

It is a further object of the present invention to provide a novel and improved compound material of the type specified above.

In accordance with the present invention there is now proposed a method of manufacturing laminated panels or foils of lead and plastics, especially polyethylene copolymers on the basis of acrylic acid, and this method is characterized by a. alloying the lead with antimony prior to forming a coating surface and/or
b. coating the lead base material with tin or a tin lead alloy or an antimony containing compound such as a lead antimony alloy, in order to produce a protective layer effective against corrosion and delamination in the metallic region of the interface between the lead and polyethylene.

The lead may be alloyed with antimony in a concentration range from 0.6 to 6 percent whereas the tin content of the coating alloy may be selected in a range from 25 percent to 100 percent tin, the remaining portion being lead. The lead base material may also be coated with a lead antimony alloy having an antimony content from 0.6 to 6 percent. Coating of the lead base material with tin, a tin lead alloy or a lead antimony alloy may be performed by a roller plating process.

According to another feature of the present invention the lead surface is coated with a protective film having the function of an adhesive agent for the applied plastic layer whereby the protective film consists of a plasticizer dissolved in a diluent and the diluent consists of monovalent alcohols or isomers thereof, and the plasticizer is of a generally known type.

The invention furthermore proposes a compound material, such as, laminated panels or foils of lead and polyethylene acrylic acid copolymers in which an antimony containing layer, such as, a lead antimony alloy is interposed between the plastics layer and the lead layer, or the lead layer surface that is coated with the plastic layer is provided with a tin or a tin lead alloy coating or with a protective film comprising a plasticizer.

The invention will be illustrated by means of the following examples.

EXAMPLE 1

Manufacture of a compound material and type of product testing

Treated lead sheets of Example 2 and polyethylene sheets of Example 3 were hot welded to each other by pressing in a heated roller gap. The surfaces of the rollers consisted of TEFLON, and the operating temperature at the roller gap was 180° C (356° F) and was kept constant by a temperature control. The time period during which the temperature was applied simultaneously with a pressure force was 4 seconds, and this time period was kept constant for all Examples. The welding quality was examined in a T-peeling test by means of a tensile test machine. The samples had a size of 100 mms (3.937 in.) length and 25 mms (0.984 in.) width, the peeling speed was 100 mms/min (3.937 in./min).

EXAMPLE 2

Type and preparation of the lead samples used

Lead 1: Lead sheet having a thickness of 0.12 mm (4.728 mil), manufactured from lead of specification PB 99.94 according to German Industrial Standard specification DIN 1719.

Lead 2: Lead sheet having a thickness of 0.11 mm (4.334 mil), manufactured from lead of specification PB 99.94 according to German Industrial Standard specification DIN 1719, additionally alloyed with 2 percent antimony.

Lead 3: Lead sheet having a thickness of 0.12 mm (4.728 mil), same specifications as lead 2 above but additionally roller plated with pure tin (tin content in excess of 99 percent).

Lead 4: Lead sheet having a thickness of 0.12 mm (4.728 mil), same specifications as lead 2 above but additionally roller plated with a tin lead alloy (tin content equal to 50 percent).

After manufacture all of the lead sheets were entirely degreased in a soxhlet apparatus by treatment with organic solvents (methylethylketone and acetone) for several hours, and before coating, they were dried in hot air.

EXAMPLE 3

Type and preparation of the polyethylene used

The type of polyethylene used consisted of polyethylene copolymers with acrylic acid, particularly polyethylene copolymers known under the the trade name LUPOLEN A 2910 MX and the name QX 2375. In the tests, the copolymers were in the form of sheets.

Polyethylene 1: Sheet having a thickness of 0.100 mms (3.937 mil), consisting of copolymers of polyethylene with acrylic acid (trade name LUPOLEN A 290 MX).

Polyethylene 2: Sheet having a thickness of 0.08 mms (3.152 mil), manufactured from copolymers of polyethylene with acrylic acid (trade name QX 2375).

All polyethylene sheet samples were cleaned prior to the lamination process by short submersion in acetone and subsequent drying in a hot air stream.

EXAMPLE 4

Test 1: Measurement of the peel strength 2 hours after coating.

Test 2: Measurement as in test 1, after a storage period of 5 days at ambient temperature.

Test 3: Measurement as in test 2, after a storage period of 21 days at ambient temperature.

Test 4: Measurement as in test 1, after a storage period of 48 hours at a temperature of 60° C (140° F) and at a relative humidity of 100 percent.

Test 5: Measurement as in test 1, after a storage period of 48 hours submerged in water having a temperature of 80° C (176° F).

The experimental results of the above tests 1-5 are given below in the tables I and II.

Table I

| | Adhesive strength in the T-peeling test for polyethylene 1 (kp/cm) | | | | |
|---|---|---|---|---|---|
| | Test 1 | Test 2 | Test 3 | Test 4 | Test 5 |
| Lead 1 | .8– .9 | .5– .7 | .2– .3 | .4– .6 | .3– .5 |
| Lead 2 | .9–1.1 | .9–1.1 | .9–1.0 | .7– .9 | .7– .8 |
| Lead 3 | 1.4–1.7 | 1.4–1.7 | 1.4–1.6 | 1.3–1.5 | 1.3–1.5 |
| Lead 4 | 1.0–1.2 | 1.1–1.3 | 1.0–1.3 | .9–1.2 | 1.0–1.2 |

Table II

| | Adhesive strength in the T-peeling test for polyethylene 2 (kp/cm) | | | | |
|---|---|---|---|---|---|
| | Test 1 | Test 2 | Test 3 | Test 4 | Test 5 |
| Lead 1 | .5– .7 | .3– .5 | .3– .4 | .2– .4 | .2– .3 |
| Lead 2 | .5– .7 | .5– .7 | .5– .7 | .4– .5 | .4– .5 |
| Lead 3 | 1.2–1.4 | 1.2–1.4 | 1.2–1.4 | 1.1–1.2 | 1.1–1.2 |
| Lead 4 | 1.0–1.2 | 1.1–1.3 | 1.1–1.4 | 1.0–1.3 | 1.0–1.2 |

Several embodiments of compound materials of lead and polyethylene produced according to the method of the present invention are shown in the appended drawing in the form of greatly enlarged schematical vertical cross-sectional views, wherein FIG. 1 is a laminated foil consisting of a lead layer and a polyethylene layer;

Figure 1:
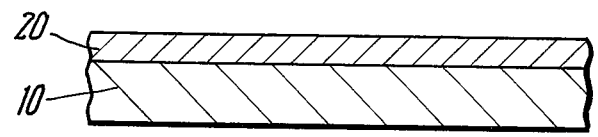
Figure 2:
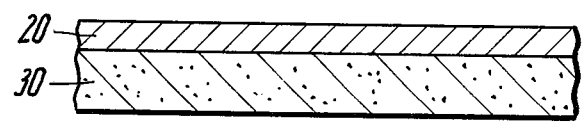
FIG. 2 is a laminated foil consisting of an antimony alloyed lead layer and a polyethylene layer.
Figure 3:
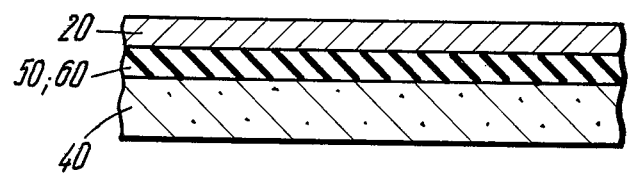
FIG. 3 is a laminated foil consisting of a lead or a lead antimony layer with an antimony or a lead antimony layer roller plated thereon, and this plated layer in turn coated with a polyethylene layer.

In the drawings, the reference numeral 10 designates a lead foil (see FIGS. 1 and 4), 30 a lead foil alloyed with antimony (see FIGS. 2 and 5), 40 a lead or a lead antimony foil, 50 a roller plated antimonious coating such as of lead antimony, 60 a roller plated lead tin coating (see FIGS. 3 and 6) applied instead of the coating 50, and 20 and 20a a polyethylene coating.

Figure 4:
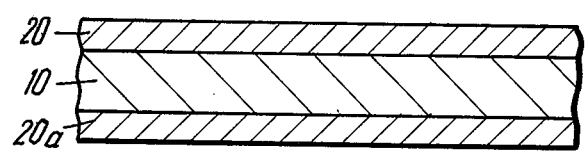
FIG. 4 is a laminated foil consisting of a lead layer coated on either side with a polyethylene layer.
Figure 5:
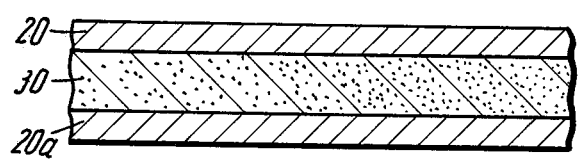
FIG. 5 is a laminated foil consisting of an antimony alloyed lead layer coated on either side with a polyethylene layer.
Figure 6:
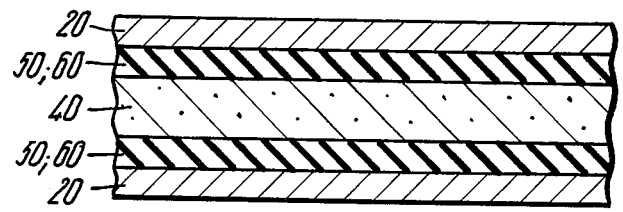
FIG. 6 is a laminated foil consisting of a lead or a lead antimony layer having an antimony, a lead antimony or a lead tin layer rolled plated thereon on either side, each coated with a polyethylene layer.

The lead foil 10, 30, 40 is coated with polyethylene either on one surface (see FIGS. 1–3) or on both surfaces (see FIGS. 4–6). Between the lead or the lead antimony foil 40 and the polyethylene coating 20 is interposed a roller plated antimonious coating such as lead antimony, or a roller plated lead tin coating such as 60 (see FIGS. 3 and 6).

The embodiments of the invention in which an exclusive property or privilege is claimed are defined as follows:

1. In a method for manufacturing a laminate of a polymeric film composed of polyethylene or polyethylene-acrylic acid copolymer and a layer of lead, consisting essentially of marrying the film and lead layer together by passing them through nip rollers, the improvement which comprises said lead layer being coated with a layer of a tin-lead alloy having a tin content in excess of 25 percent, said alloy layer being coated with a protective and adhesive film of a plasticizer for the polymeric film in a diluent prior to being married to the polymer layer.

2. In a method for manufacturing a laminate of a polymeric film composed of polyethylene or polyethylene-acrylic acid copolymer and a layer of lead, consisting essentially of marrying the film and lead layer together by passing them through nip rollers, the improvement which comprises said lead layer being coated with a layer of a lead-antimony alloy, the amount of antimony being 0.6 to 6 percent, said alloy layer being coated with a protective and adhesive film of a plasticizer for the polymeric film in a diluent prior to being married to the polymer layer.

* * * * *